(12) United States Patent
Tatko et al.

(10) Patent No.: US 6,501,504 B1
(45) Date of Patent: Dec. 31, 2002

(54) DYNAMIC RANGE ENHANCEMENT FOR IMAGING SENSORS

(75) Inventors: H. John Tatko, Stow, OH (US); Dale Robert Sebok, Tallmadge, OH (US); Thomas J. Sebok, Tallmadge, OH (US)

(73) Assignee: Lockheed Martin Corporation, Akron, OH (US)

( * ) Notice: Subject to any disclaimer, the term of this patent is extended or adjusted under 35 U.S.C. 154(b) by 0 days.

(21) Appl. No.: 08/968,535

(22) Filed: Nov. 12, 1997

(51) Int. Cl.[7] ............................................... H04N 5/235
(52) U.S. Cl. ..................................... 348/229.1; 348/362
(58) Field of Search ........................... 348/216.1, 217.1, 348/229.1, 362, 363, 364, 365, 366, 370, 230.1

(56) References Cited

U.S. PATENT DOCUMENTS

| | | | | |
|---|---|---|---|---|
| 5,185,671 A | * | 2/1993 | Lieberman et al. | 348/365 |
| 5,420,635 A | * | 5/1995 | Konishi et al. | 348/362 |
| 5,801,773 A | * | 9/1998 | Ikeda | 348/362 |
| 5,877,810 A | * | 3/1999 | Inuiya et al. | 348/362 |
| 5,995,145 A | * | 11/1999 | Viliesid | 348/362 |
| 6,111,607 A | * | 8/2000 | Kameyama | 348/256 |
| 6,137,533 A | * | 10/2000 | Azim | 348/222 |
| 6,320,615 B1 | * | 11/2001 | Kim | 348/229 |

* cited by examiner

Primary Examiner—Wendy R. Garber
Assistant Examiner—Jacqueline Wilson
(74) Attorney, Agent, or Firm—Renner, Kenner, Greive, Bobak, Taylor & Weber

(57) ABSTRACT

A system for enhancing the dynamic range of an imaging signal includes a sensor for viewing a scene having a wide dynamic range and generating a digital image signal of the scene which is received by an attenuator for selectively attenuating the digital image signal. A demultiplexer is included in the system for receiving the digital image signal into at least a first gain signal and a second gain signal wherein a combiner receives the first and second gain signals and produces a composite image signal with minimal saturation. A normalizer may also be provided for receiving the composite image signal and adjusting it to a viewable range dynamic video output signal.

20 Claims, 5 Drawing Sheets

DYNAMIC RANGE ENHANCEMENT FOR IMAGING SENSORS

TECHNICAL FIELD

The present invention herein resides in the art of digital imaging. More particularly, the present invention relates to digital imaging of a scene which has extreme lighting level differences. Specifically, the present invention relates to digital imaging of a video signal wherein the video signal is segmented according to respective gain level settings and wherein the segmented signals are recombined into a composite output signal presenting the most important information from the video signal.

BACKGROUND ART

In current video cameras and digital imaging capture systems, a gain setting or exposure level is set to enhance the presentation of the viewed image. These systems work well with scenes that are highly illuminated or where plenty of ambient light is present. For example, daytime or well lit rooms provide adequate lighting for viewing the scene with the video camera or sensing device. However, nighttime scenes are not easily viewed due to the lack of illumination. In order to enhance viewing of nighttime or poorly illuminated scenes, the gain setting or exposure time is increased to capture any ambient light available.

It is known that current systems are capable of adjusting the exposure or gain of the optical/electrical components within the sensor to provide viewable imaging as long as the scene's ambient lighting remains within the sensitivity range of the sensor. Current sensors provide either overexposed or underexposed imagery if the ambient conditions exceed the dynamic range of a sensor at a given gain level. This results in the loss of useful scene information and over-illuminated or under-illuminated areas of the scene. In other words, a low gain video image only presents viewable information very near the predominate light source, whereas a high gain video image only presents useful image information away from the predominant light source.

It will be appreciated that poor lighting conditions are especially frustrating in military or aviation applications where a pilot is viewing a video monitor of an approaching target, at night, where the scenery includes bright city lights. Accordingly, the target locations within or near the city are not easily detected because of the lost video information. A wide range of lighting levels and their associated problems may also occur in night-time surveillance systems or police helicopter surveillance of urban areas.

In light of the foregoing, it is evident that there is a need to view a scene with a wide dynamic range and to present the scene in an image wherein the highly illuminated areas do not over-saturate the dimly illuminated areas so as to generate a composite image of the scene.

DISCLOSURE OF INVENTION

In light of the foregoing, it is a first aspect of the present invention to provide a dynamic range enhancement system.

Another aspect of the present invention is to provide a dynamic range enhancement system with a sensor to view an optical image, wherein the sensor has a video attenuator coupled thereto to adjust gain levels or exposure times to predetermined settings.

Yet another aspect of the present invention, as set forth above, is to provide a controller that is attached to both the sensor and the video attenuator to adjust the gain levels or exposure times at predetermined intervals.

Still another aspect of the present invention, as set forth above, is to time multiplex on a field basis between unattenuated (high gain) and attenuated (low gain) video signals such that both high and low gain video signals are available simultaneously for analysis.

A further aspect of the present invention, as set forth above, is to provide a combiner which receives the high gain and low gain video signals and combines them into a composite signal with minimal saturation.

Yet a further aspect of the present invention, as set forth above, is to provide a normalizer which receives the composite video signal to reduce the dynamic range of the signal while preserving important scene information content for viewing by the human eye.

The foregoing and other aspects of the present invention which shall become apparent as the detailed description proceeds are achieved by a system for enhancing the dynamic range of an imaging signal, comprising a sensor for viewing a scene having a wide dynamic range and generating a digital image signal of the scene; an attenuator coupled to the sensor for selectively attenuating the digital image signal; a demultiplexer for receiving the digital image signal and grouping like attenuated signals into at least a first gain signal and a second gain signal; and a combiner for receiving the first and second gain signals and producing a combined image signal with minimum saturation.

Other aspects of the present invention are attained by a method for enhancing an imaging signal, comprising the steps of viewing a scene with a sensor that generates a digital image signal representative of the scene; coupling an attenuator to the sensor to generate different exposure levels while generating the digital image signal; demultiplexing the digital image signal into at least a first digital image signal and a second digital image signal corresponding to attenuation levels set by the attenuator; combining the first and second digital image signals to produce a composite image signal containing both low and high illuminated areas of the scene with minimal saturation.

BRIEF DESCRIPTION OF THE DRAWINGS

For a complete understanding of the objects, techniques and structure of the invention, reference should be made to the following detailed description and accompanying drawings wherein.

BEST MODE FOR CARRYING OUT THE INVENTION

Figure 1:
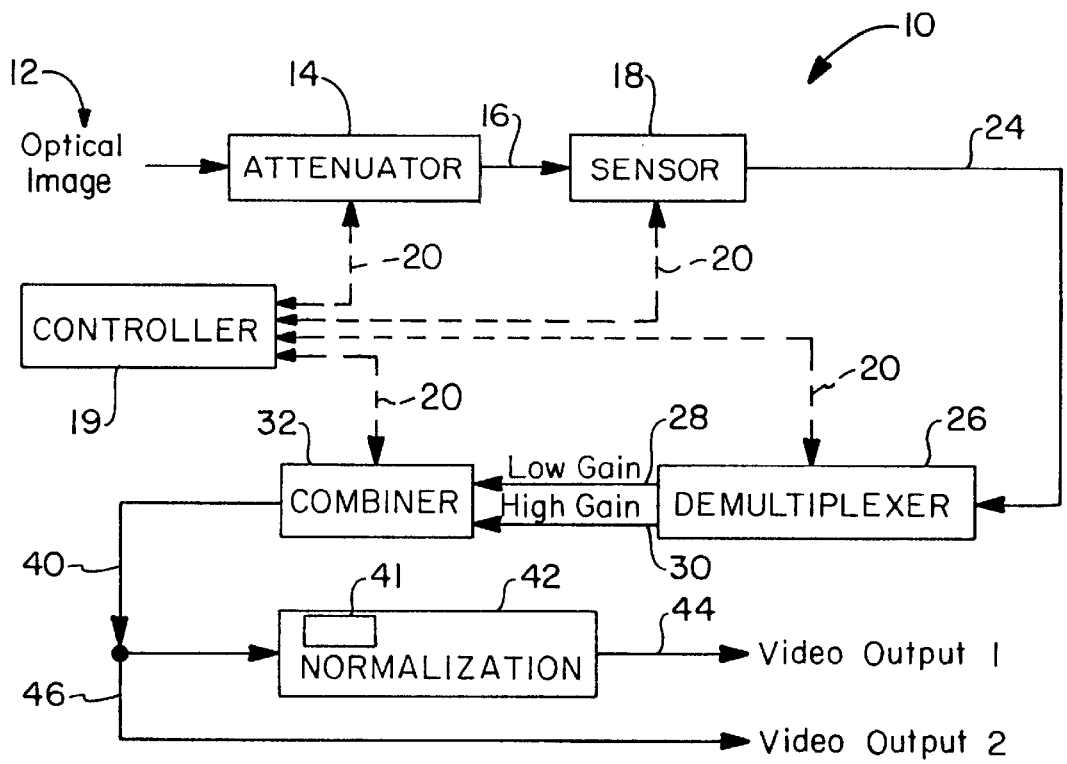
FIG. 1 is a block diagram of the dynamic range enhancement system of the present invention.

Referring now to the drawings and particularly to FIG. 1, it can be seen that a dynamic range enhancement system according to the present invention, is designated generally by the numeral 10. As shown, the system 10 is employed to capture an optical image 12 which is typically any scene to be viewed and analyzed in a real-time image processing environment. It will be appreciated that the optical image 12 may be any day-time or night-time scene with either dimly-illuminated or highly-illuminated characteristics. The present invention is especially useful in viewing dimly-illuminated scenes with discrete highly-illuminated light sources.

An attenuator 14 is included in the system 10 and generates a gain signal 16 received by a sensor 18. It will be appreciated that the sensor 18 may be a charge-coupled device (CCD), an image intensified CCD or other imaging array. Moreover, the sensor 18 may be capable of either capturing a video image or a still image, depending upon the particular application. Additionally, the sensor 18 may be any source of digital imaging with different gain settings utilized for capturing the optical image 12. In the preferred embodiment, the sensor 18 is used to capture video images.

A controller 19 is connected to the attenuator 14 and the sensor 18 by control signal lines 20 for the purpose of setting or adjusting the gain variations of the attenuator 14. In embodiments where a CCD is used for the sensor 18, the controller 19 adjusts the integration time. In embodiments where a digital camera is used for the sensor 18, the controller 19 adjusts the iris setting. Depending upon the particular application, the type of scene being viewed and the sensor 18, the controller 19 adjusts the gain setting in alternating frames of video. In other words, one frame of video is captured at a high gain setting and the subsequent frame of video is captured at a low gain setting. This process is repeated accordingly. When the sensor 18 is a still digital camera, it will be appreciated that any number of high gain-set frames can be taken with a corresponding number of low gain-set frames. The controller 19 in the preferred embodiment is a field programmable gate array, such as manufactured by Xilinx, Inc.

The sensor 18 generates a digital image signal 24 which is received by a demultiplexer 26, which in turn stores frames of the digital image signal 24 in predetermined groups. In particular, the demultiplexer 26 segments the digital image signal 24 on a field basis between unattenuated (high gain) and attenuated (low gain) signals. The demultiplexer 26 then stores the appropriate field of video, corresponding to the gain signal applied to the sensor 18 by the attenuator 14, and outputs a corresponding low gain signal ($V_{LG}$) 28 and a high gain signal ($V_{HG}$) 30 which are available simultaneously at the output of the demultiplexer 26. For video images it is preferred that only two signals be multiplexed. If more than two video signals are taken, the output image tends to be smeared and detracts from the appearance thereof. Operation of the demultiplexer 26 is sequenced by the controller 19 via the signal line 20 to coordinate actions between the demultiplexer, the sensor 18 and the attenuator 14. Alternatively, the demultiplexer 26 could be in the form of two sensors which are co-boresighted. In other words, both sensors would be looking at exactly the same scene but utilizing different gain signals to capture the optical image 12. Accordingly, each sensor would generate its appropriate gain signal.

A combiner 32, which is in communication with the controller 19 via the signal line 20, receives the low gain signal 28 and the high gain signal 30. Utilizing one of various algorithms, the combiner 32 generates a composite image signal 40 from the signals 28 and 30 by taking the most pertinent information from each. It will be appreciated that when the sensor 18 operates under night-time conditions, information contained in an image can span 15 bits (32,768). Most light amplified electro-optical sensors can cover at the most an 8 bit to 10 bit dynamic range. Furthermore, the human eye can only distinguish locally 6 bits. The combiner 32 allows for an 8 to 10 bit light amplified electrical optical sensor to cover the scene's entire dynamic range. Ultimately, this allows the human eye to view the resulting image with a minimum loss in scene information content. Generally, the combiner 32 merges the low and high gain signals 28 and 30 and produces an output with minimum saturation. To simplify discussion of these various methods, the equations below employ the following variables.

LG=low gain
HG=high gain
C=constant
F(·) and G(·) are corresponding functions of LG and HG.
HTHR=high gain threshold
LTHR=low gain threshold
$V_{HG}$=intensity value for the high gain signal
$V_{LG}$=intensity value for the low gain signal
$P_{LG}$=points for which $V_{HG} \geq$ HTHR
AT=attenuation factor
$V_{ZERO}$=video black value One algorithm used by the combiner 32 is a linear combination wherein the composite image signal 40 is defined by the variable OUT. Thus, a representative equation is:

$$OUT = C*LG + HG \quad (1)$$

In the linear combination, the constant C can be set to the attenuation factor AT or to an arbitrary value dictated by the hardware of the system 10.

Another method of combining the low gain signal 28 and the high gain signal 30 is embodied in the following non-linear equation:

$$OUT = C*F(LG,HG)*LG + G(LG,HG)*HG \quad (2)$$

This method takes a function of the low gain and high gain and multiplies it by a corresponding low gain or high gain intensity value.

Figure 2A:
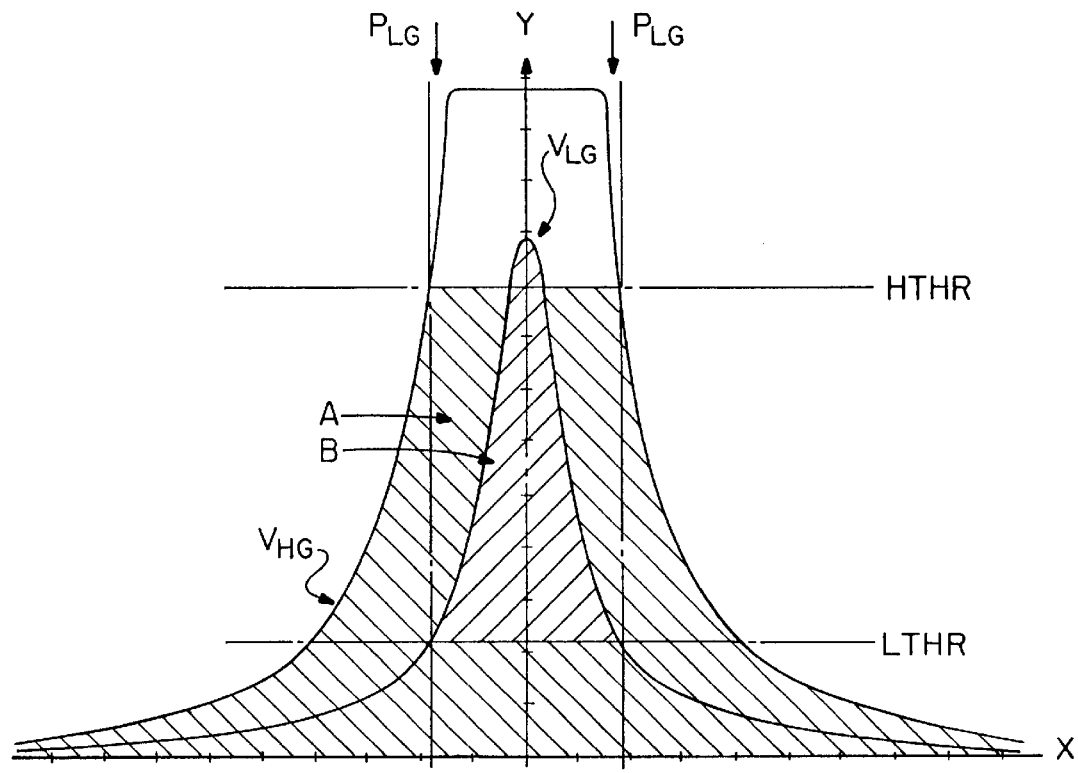
FIGS. 2A and 2B are graphical representations of one embodiment showing how the high gain and low gain signals are combined into a composite output signal.
Figure 2B:
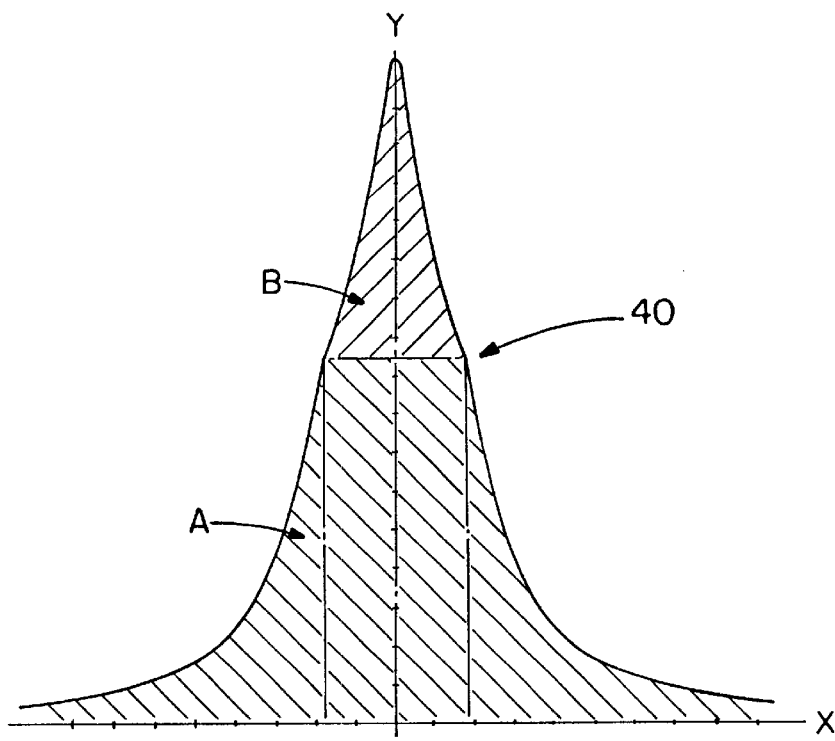

Another method of combining the low gain and high gain signals 28 and 30, which is referred to as a cookie-cutter method, is graphically represented in FIGS. 2A and 2B. This method removes all signal information from $V_{HG}$ that is greater than or equal to HTHR and retains all signal information of $V_{HG}$ less than HTHR. Next, the method retains all signal information from $V_{LG}$ that is greater than LTHR. Accordingly, the composite image signal 40 (OUT) is defined by the following equations.

$$OUT = V_{HG} \text{ if } V_{HG} \leq HTHR \quad (3)$$

$$OUT = HTHR - LTHR + V_{LG}C \text{ if } V_{HG} > HTHR \quad (4)$$

In other words, the high gain signal 30 is represented by the shaded area A in FIG. 2A and the low gain signal 28 is represented by the shaded area B as defined by equations 3 and 4 above. Shaded area B is shifted by HTHR-LTHR and combined with shaded area A as shown in FIG. 2B.

From the above, it will be appreciated that a portion of the high gain signal 30 and a portion of the low gain signal 28 are combined with one another to generate the composite image signal 40. This method quickly and easily combines the two image signals in an attempt to generate a "seamless" image. However, it will be appreciated that the values HTHR and LTHR may not be constant values throughout the image generation process. This results in discontinuities in the image and may generate an image that is not seamless.

Figure 3A:
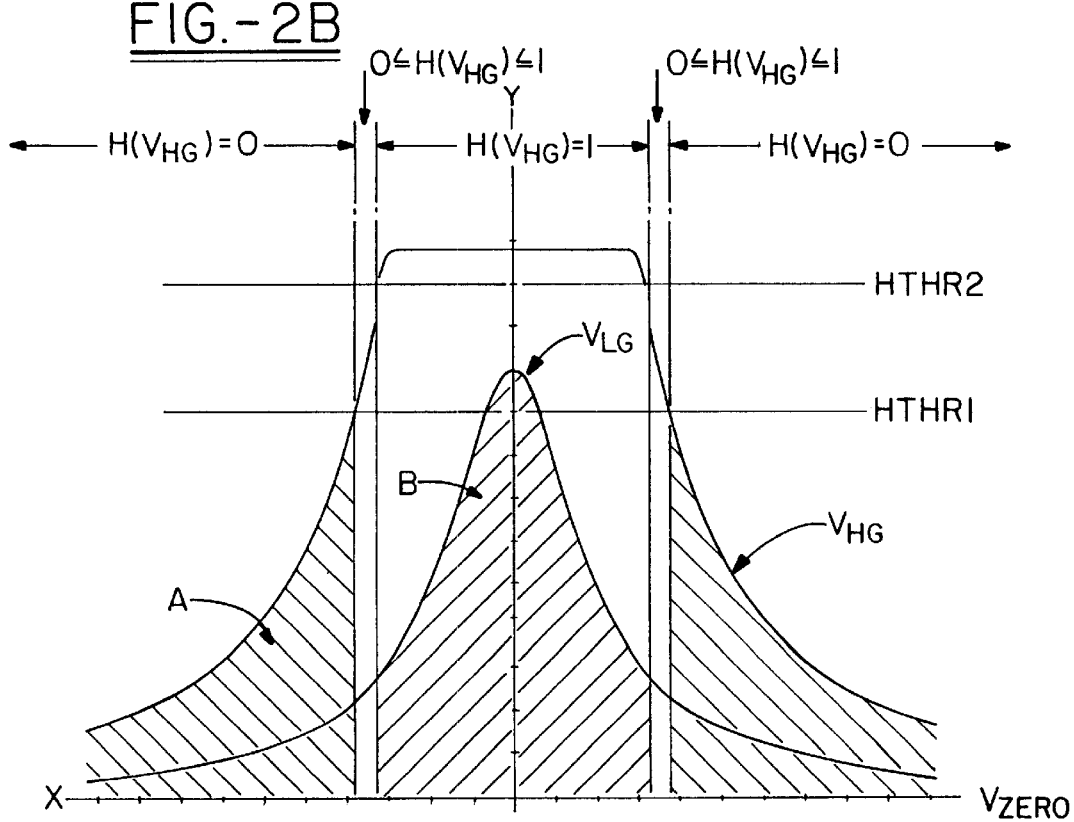
FIGS. 3A and 3B is an alternative embodiment for combining the high gain and low gain signals into a composite output signal.
Figure 3B:
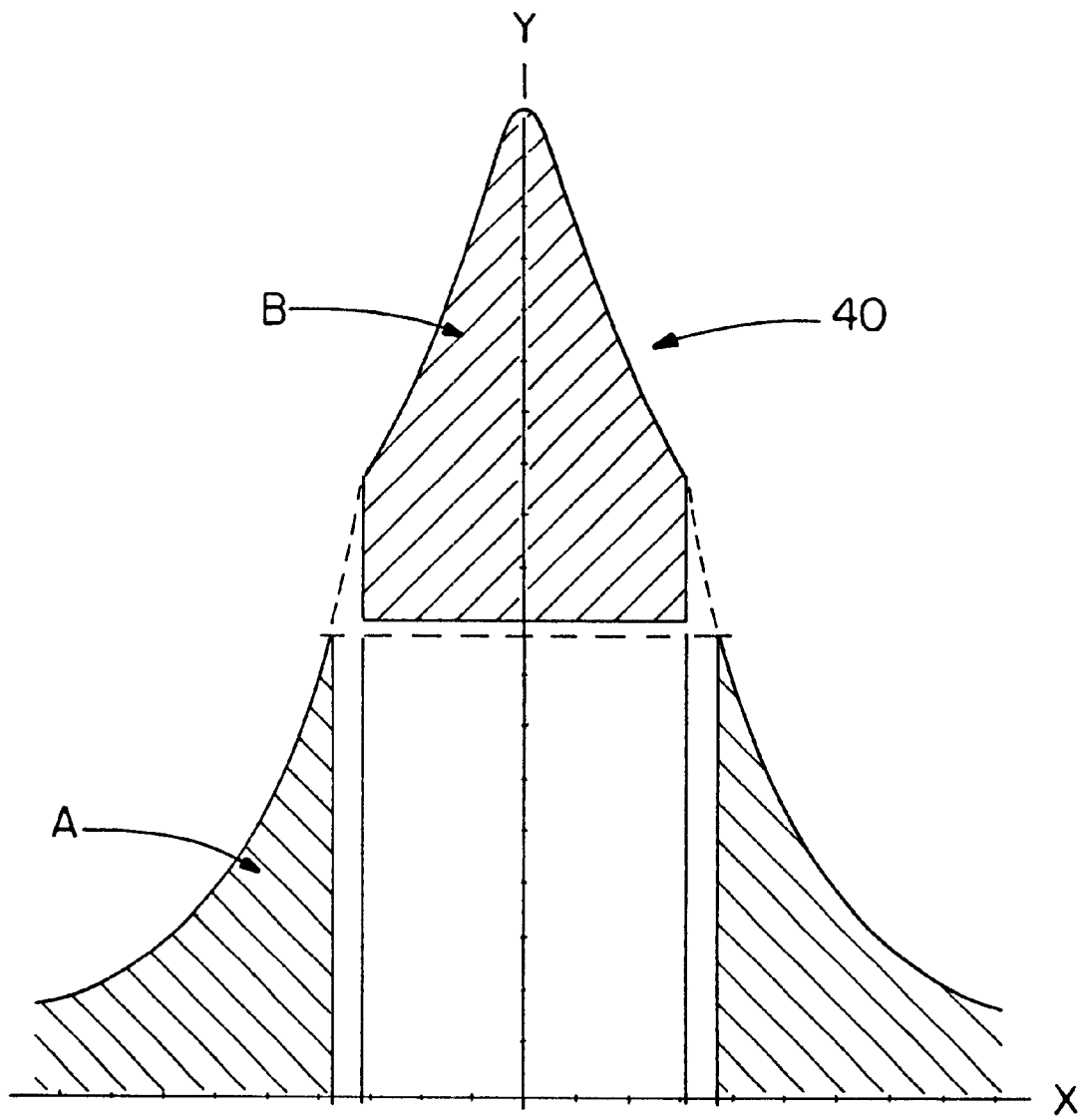

Another method of combining the low gain and high gain image signals 28 and 30, which is referred to as an attenuator-based merge method, is presented in FIGS. 3A and 3B. Given the values $V_{ZERO}$, HTHR1, and HTHR2 and the function $H(V_{HG})$, OUT may be defined as follows.

$$H(V_{HG})=0 \text{ if } V_{HG} \leq HTHR1 \qquad (5)$$

$$H(V_{HG})=1 \text{ if } V_{HG} \leq HTHR2 \qquad (6)$$

$$0 \leq H(V_{HG}) \leq 1 \text{ if } HTHR1 < V_{HG} \leq HTHR2 \qquad (7)$$

$$OUT=(1-H(V_{HG}))*(V_{HG}-V_{ZERO})+H(V_{HG})*AT*(V_{LG}-V_{ZERO}) \qquad (8)$$

Note if Image did not saturate $V_{HG}-V_{ZERO}=AT*(V_{LG}-V_{ZERO})$ (9)

As seen from the above equations and FIG. 3A, portions of the high gain signal $V_{HG}$ are represented by the areas shaded with an A designation and that a portion of the low gain signal $V_{LG}$ is represented by the area shaded with a B designation. Portions A and B are off-set from one another by interpolating data between the functions of the high gain signal 30 and the low gain signal 28. This results in the composite image signal 40 as represented in FIG. 3B, wherein a smooth transition is presented between the high gain and low gain signals.

The composite image signal 40 may also be defined as a combination of selected portions of the low gain signal 28 and the high gain signal 30. Referring to FIG. 3A, a portion of the low gain signal 28 may be defined along the y-axis with a lower limit of $V_{ZERO}$ and no upper limit. The portion of the low gain signal 28 may be defined along the x-axis as those points bounded by $H(V_{HG})=1$. In regard to the high gain signal 30, portions are defined along the y-axis as any point between $V_{ZERO}$ and HTHR1 and along the x-laxis as any point defined by $H(V_{HG})=0$. In combining all these portions to define a seamless composite image signal 40, FIG. 3B illustrates that those points defined by $0 \leq H(V_{HG}) \leq 1$ provide a transition or interpolation therebetween. In this interpolation area, it will be appreciated that a linear monotomically increasing function is employed with weighting toward the method in which the signal is directed.

Based upon the foregoing methods of utilizing the combiner 32, it will be appreciated that considerations such as processing time and efficiency are considered when selecting which combining method to use. In any event, it will be appreciated that the composite image signal 40 generated by the combiner 32 typically has a much larger dynamic range than the original video signal. Accordingly, only certain portions of the composite image signal 40 are viewable by the human eye. In order to properly display the composite image signal 40, it is received by a normalizer 42 which reduces the original video signal range while preserving the scene's information content to generate a viewable range dynamic video output signal 44.

To properly understand the normalization steps, the following definitions are required:
$V_{COMB}$=video of the composite image signal 40
$V_{CAVG}$=n×m average of $V_{COMB}$, where n×m defines a pixel matrix or block within the composite image signal 40
$I(\cdot)$ and $J(\cdot)$ are monotomically increasing functions One easily employed method for normalizing the composite image signal 40 is to employ a nonlinear mapping of $V_{COMB}$. This method employs a "static" lookup table 41 in the normalizer 42 which emphasizes the low intensity values while de-emphasizing the large intensity values in the composite image signal 40 for all video fields. In other words, the nonlinear mapping employs algorithmic functions to emphasize the portions of the composite image signal 40 which contain viewable scene information therein.

Still another method to normalize the composite image signal 40 is to employ a "dynamic" table look-up function in which the table values are calculated from global image information obtained by calculating a histogram of the composite image signal for each video field. The normalization is then accomplished by applying a non-linear mapping function, which is determined using the histogram for each field of video, for the composite image signal 40, which in turn generates the video output signal 44. In other words, each video field generates a non-linear mapping function that is then applied to the composite image signal 40 to generate the video output signal 44.

Still another method of normalizing the composite image signal 40 to generate the video output signal 44 is to apply a monotomically increasing function wherein a high pass filtering equation $$OUT=V_{COMB}-I(V_{CAVG}) \qquad (10).$$

is employed. This equation removes the oversaturated points within the composite image signal 40.

Another filtering method employs a geometric equation based upon low pass filtering $$OUT=V_{COMB}/J(V_{CAVG}) \qquad (11)$$

that also employs a monotomically increasing function. This equation passes portions of the composite image signal 40 that provide useful scene information.

It will be appreciated that the output of the combiner 32 may be embodied in a second video output signal 46 which is used for further processing. In particular, signal 46 may be used for tracking targets by using optical flow detection or other methods of image processing.

Figure 4:
FIG. 4 is a representation of a low gain signal.
Figure 5:
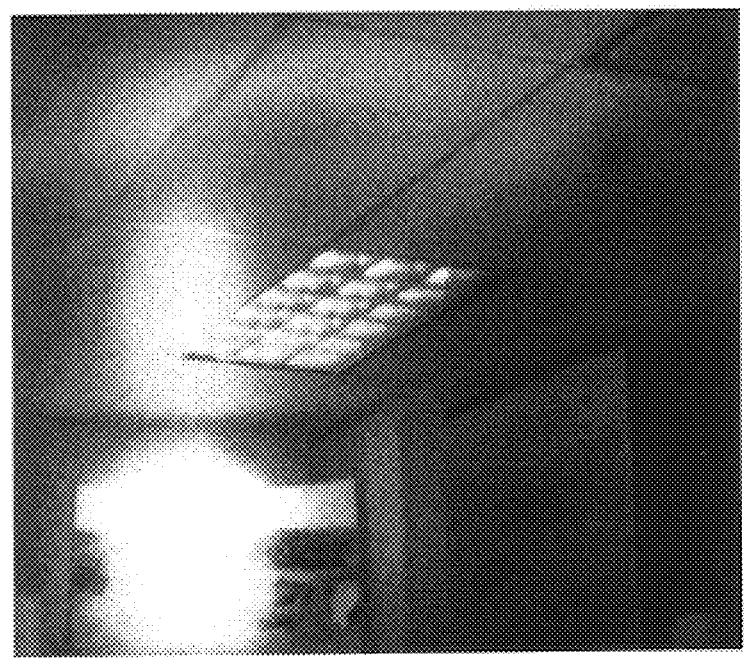
FIG. 5 is a representation of a high gain signal.
Figure 6:
FIG. 6 is a representation of a video output signal utilizing the low gain and high gain signals shown in FIGS. 4 and 5.

As best seen in FIGS. 4–6, a representation of the low gain signal 28 is shown in FIG. 4 and a representation of the high gain signal 30 is shown in FIG. 5. The low gain signal 28 shown in FIG. 4 only provides useful scene information near the light source. The high gain signal 30 shown in FIG. 5 only provides useful scene information away from the light source. By employing an attenuation factor of 1/32 with the attenuator-based merge method in the combiner 32 and by using the filtering equation (11), the video output signal 44 shown in FIG. 6 is generated. Clearly, display of a viewable video output signal 44 is shown which provides the most useful scene information from both the low gain and high gain signals.

In light of the foregoing, it will be appreciated that the structures and methods of use of the present invention provide numerous advantages over the known art. In particular, use of the present invention allows for the combination of two or more image fields of different gains to produce a composite image which simultaneously contains useful scene information of both poorly illuminated and highly illuminated scenes. A further advantage of the present invention is that it allows for use of video cameras in low-light areas. These advantages allow for nighttime viewing of scenes with discrete bright light sources. In military applications, this enhances the success of a mission by increasing the amount of useful scene information. These advantages could also be utilized with hand-held video cameras to enhance presentation of the optical image viewed.

Thus, it can be seen that the objects of the invention have been satisfied by the structure and use of the invention as presented above. While in accordance with the patent statutes, only the best mode and preferred embodiment of the invention has been presented and described in detail, it is to be understood that the invention is not limited thereto or thereby. Accordingly, for an appreciation of the true scope and breadth of the invention, reference should be made to the following claims.

What is claimed is:

1. A system for enhancing the dynamic range of an imaging signal, comprising:

an attenuator;

a single sensor for viewing a scene having a wide dynamic range and generating a digital image signal of the scene, said attenuator coupled to said sensor for alternatingly generating a gain adjustment signal received by said single sensor to generate said digital image signal;

a demultiplexer for receiving said digital image signal and grouping like attenuated signals into at least a first gain signal and a second gain signal; and a combiner for receiving said first and second gain signals, taking pertinent signal information from each said first and second gain signals and producing a real-time combined image signal with minimum saturation; and a normalizer for receiving said combined image signal, wherein said normalizer assigns a value $V_{CAVG}$, which is an average value of pixels in a preselected area of said combined image signal and applies a mathematical function of $V_{CAVG}$ to said combined image signal to generate a viewable range dynamic video output signal.

2. The system according to claim 1, further comprising:

a normalizer for receiving and adjusting all possible subimages of a given size of said combined image signal to a viewable range dynamic video output signal based upon at least said subimages.

3. The system according to claim 1, wherein said combiner generates said combined image signal by multiplying one of said first and second gain signals by a constant and by adding the product thereof to the other of said first and second gain signals.

4. The system according to claim 1, wherein said combiner generates said combined image signal by generating a first and a second function of the first and second gain signals, wherein said first function is multiplied by one of said first and second gain signals and said second function is multiplied by the other of said first and second gain signals.

5. The system according to claim 1, wherein said combiner selects a first portion of said first gain signal at least greater than a first predetermined threshold and a second portion of said second gain signal at least less than a second predetermined threshold to generate said combined image signal by combining said first and second portions.

6. The system according to claim 1, wherein said combiner sets a first threshold that is less than a second threshold and said first gain signal is scaled by a constants wherein if said second gain signal is less than said first threshold, said combiner outputs said second gain signal, but if said second gain signal is greater than said second threshold, said combiner outputs said scaled first gain signal, and wherein if said second gain signal is greater than said first threshold but less than said second threshold, said combiner outputs a function of said first and second gain signals, wherein said function monotonically changes from said second gain signal to said scaled first gain signal as said second gain signal changes from said first threshold to said second threshold.

7. The system according to claim 1, wherein said normalizer generates said viewable range dynamic video signal by receiving said output signal into a static look-up table which logarithmically converts unviewable extreme intensity values of said combined image signal for all video fields into viewable intensity values.

8. The system according to claim 1, wherein said normalizer generates said output signal by receiving said combined image signal and assigning a dynamic viewable value to each pixel element of said combined image signal based upon a non-linear mapping function for each video field.

9. The system according to claim 1, wherein said normalizer subtracts a function of $V_{CAVG}$ from said combined image signal to generate said output signal.

10. The system according to claim 1, wherein said normalizer divides said combined image signal by a function of $V_{CAVG}$ to generate said output signal.

11. A method for enhancing an imaging signal, comprising the steps of:

viewing a scene with only one sensor that generates a digital image signal representative of the scene;

coupling an attenuator to said one sensor to generate different exposure levels while generating said digital image signal;

demultiplexing said digital image signal into at least a first digital image signal and a second digital image signal corresponding to attenuation levels set by said attenuator;

combining said first and second digital image signals and taking pertinent signal information from each said first and second digital image signals to produce a real-time composite image signal containing both low and high illuminated areas of the scene with minimal saturation receiving said composite image signal into a normalizer; said normalizer receiving said composite image signal into a normalizer;

assigning a value $V_{CAVG}$, which is an average value of pixels in a preselected area of said combined image signal, for each pixel; and applying a mathematical function of $V_{CAVG}$ to said combined image signal to generate a viewable output image signal.

12. The method according to claim 11, further comprising the steps of:

normalizing all possible subimages of a given size of said composite image signal to generate a viewable output signal based upon at least some of said subimages.

13. The method according to claim 11, wherein said step of combining comprises the step of:

multiplying one of said first and second digital image signals by a constant and adding the product thereof to the other of said first and second digital image signals to generate said composite image signal.

14. The method according to claim 11, wherein said step of combining comprises the steps of:

a) multiplying a function of both said first and second digital image signals by one of said first and second digital image signals;

b) multiplying a function of both said first and second digital image signals by the other of said first and second digital image signals; and c) adding the products of steps a) and b) to generate said composite image signal.

15. The method according to claim 11, wherein said step of combining comprises the steps of:
selecting a first portion of said first digital image signal at least greater than a first predetermined threshold;
selecting a second portion of said second digital image signal at least less than a second predetermined threshold; and
generating said combined image signal by combining said first and second portions.

16. The method according to claim 11, wherein said step of combining comprises the steps of:
setting a first and a second threshold, wherein said first threshold is less than said second threshold;
scaling said first gain signal by a constant;
outputting said second gain signal if said second gain signal is less than said first threshold;
outputting said scaled first gain signal if said second gain signal is greater than said second threshold; and
outputting a function of said first and second gain signals if said second gain signal is greater than said first threshold but less than said second threshold, wherein said function monotonically changes from said second gain to said scaled first gain signal as said second gain signal changes from said first threshold to said second threshold.

17. The method according to claim 11, wherein said step of normalizing comprises the step of:
receiving said combined image signal into a look-up table which logarithmically converts unviewable extreme intensity values of said combined image signal for all video fields into viewable intensity values to generate said viewable output signal.

18. The method according to claim 12, wherein said step of normalizing comprises the step of:
receiving said combined image signal and assigning a viewable value to each pixel element of said combined image signal based upon a non-linear mapping function for each video field and generating said viewable output signal therefrom.

19. The method according to claim 11, wherein said step of normalizing comprises the steps of:
subtracting a function of $V_{CAVG}$ from said combined image signal to generate said viewable output signal.

20. The method according to claim 11, wherein said step of normalizing comprises the steps of:
dividing said combined image signal by a function of $V_{CAVG}$ to generate said viewable output signal.

* * * * *

UNITED STATES PATENT AND TRADEMARK OFFICE
CERTIFICATE OF CORRECTION

PATENT NO.   : 6,501,504 B1                                                      Page 1 of 1
DATED        : December 31, 2002
INVENTOR(S)  : H. John Tatko It is certified that error appears in the above-identified patent and that said Letters Patent is hereby corrected as shown below:

<u>Column 7,</u>
Line 58, the word "constants" should be deleted and -- constant, -- should be substituted therefor.

Signed and Sealed this

Eleventh Day of November, 2003

JAMES E. ROGAN
*Director of the United States Patent and Trademark Office*